United States Patent [19]
Ghusn et al.

[11] 3,990,748
[45] Nov. 9, 1976

[54] PORTABLE MATERIAL RESLURRYING APPARATUS AND METHOD OF OPERATION

[75] Inventors: Abdallah E. Ghusn, Oakland; William R. Archibald, San Anselmo, both of Calif.

[73] Assignee: Marcona Corporation, San Francisco, Calif.

[22] Filed: Aug. 1, 1975

[21] Appl. No.: 601,318

Related U.S. Application Data

[63] Continuation of Ser. No. 418,786, Nov. 23, 1973, abandoned.

[52] U.S. Cl. .............................. 302/15; 214/15 B; 302/58
[51] Int. Cl.² ...................................... B65G 53/30
[58] Field of Search ....................... 302/58, 14–16; 214/14, 15 B; 37/61–63

[56] References Cited
UNITED STATES PATENTS

| | | | |
|---|---|---|---|
| 1,778,942 | 10/1930 | Harp | 37/63 |
| 3,153,290 | 10/1964 | Saito | 37/62 |

FOREIGN PATENTS OR APPLICATIONS

| | | | |
|---|---|---|---|
| 701,793 | 3/1931 | France | 302/58 |

*Primary Examiner*—John J. Love
*Assistant Examiner*—Jeffrey V. Nase
*Attorney, Agent, or Firm*—Flehr, Hohbach, Test, Albritton & Herbert

[57] ABSTRACT

Apparatus and method of operation for removing a settled body of discrete particulate material confined within a vessel or other container. The apparatus includes a housing which supports a plurality of nozzles adapted to direct streams of water to impinge upon and form a slurry with the material as the nozzles are oscillated back-and-forth about vertical axes. A pair of the nozzles are mounted for vertical movement between raised and lowered positions. In the raised positions the water streams from the nozzles are directed downwardly by deflector plates for a sinking stage of operation, and in the lowered position the water streams clear the deflector plates for the clean-up stage of operation. Another pair of nozzles are fixed in vertical position on the housing and are disposed to direct their water streams outwardly in a horizontally direction for a material discharge stage of operation. A mechanically driven pump carried within the housing has a downwardly opening suction inlet for pumping the slurry to a shore installation. An annulus eductor is mounted below the suction inlet to prime the pump and to maintain adequate liquid flow as the level of slurry approaches the floor of the vessel.

11 Claims, 14 Drawing Figures

PORTABLE MATERIAL RESLURRYING APPARATUS AND METHOD OF OPERATION

This is a continuation of application Ser. No. 418,786, filed Nov. 23, 1973, now abandoned.

BACKGROUND OF THE INVENTION

This invention relates to the handling of particulate material, and more specifically relates to method and apparatus for removing a settled body of particulate material of the type that forms a pumpable slurry with a liquid.

Heretofore bulk particulate material such as dressed mineral ores, mineral salts and other finely divided material has been transported for storage or processing by procedures which involve forming a slurry of the material with a liquid. As an example, dressed mineral ores at a mining operation have been formed into a slurry with water, pumped through pipelines into the hold of a ship or other vessel, settled in the hold by decanting supernatant water fractions, transported to destination, unloaded by reslurrying the settled material with water jets mounted within the hold, and then pumping the reslurried material from the vessel to a shore installation. Procedures of the foregoing nature are costly in view of the highly specialized equipment that is required in the vessel for the reslurrying operation. It is necessary to either initially design and build the vessel with the required reslurrying equipment, or extensively modify existing vessels. The result is that the cost of a reslurrying vessel of the type described requires a considerable capital outlay which is not justified except with relatively frequent slurry cargo discharging because the on-board reslurrying equipment in such a vessel is used only during slurry unloading operations.

OBJECTS AND SUMMARY OF THE INVENTION

It is an object of the invention to provide improved method and apparatus for removing a settled body of discrete particulate material of the type that forms a pumpable slurry with a liquid. The present invention is specially applicable to method and apparatus for unloading such material from vessels or containers such as ships or barges.

Another object is to provide method and apparatus of the character described which employs a portable capsule or housing enclosing liquid jet nozzles and slurry pump equipment, and in which the capsule can be moved to and from the material and lowered and raised by means of a movable crane or other supporting structure positioned alongside the body of material.

Another object is to provide method and apparatus of the character described in which at least one of the nozzles is adapted for vertical movement between one position at which its water stream is deflected downwardly for a sinking stage of operation and another position at which its stream is directed horizontally outwardly for a clean-out operation. At least another of the nozzles directs water horizontally outwardly for a material discharge stage of operation.

Another object is to provide method and apparatus of the character described in which a mechanically driven slurry pump has its suction inlet opening downwardly, and an annulus eductor is mounted vertically below and in series the pump to direct water upwardly into the inlet to maintain the prime of the pump.

Another object is to provide method and apparatus of the above character which provides a low cost adaptable discharge unit operable independently of a vessel for the reslurrying of particulate cargo and unloading of the same from vessels of various types without requiring any modifications to the vessel.

The method of the invention includes discharging liquid streams from nozzles carried within a portable housing while operating the pump to remove the slurry formed by liquid impinging upon the material. Additional streams of liquid are directed upwardly into the pump intake to maintain the prime of the pump and to provide sufficient liquid to the pump during low slurry flow, particularly during the clean-up stage of operation.

In the apparatus a portable housing is provided together with means for moving the housing to and from the material, and to position the housing within the material. Nozzle means are provided in the housing to direct liquid streams outwardly to form a slurry with the material. Pump means for pumping the slurry away is provided with a downwardly opening suction inlet. Eductor means mounted below the inlet includes an annular conduit provided with additional nozzles which spray liquid streams upwardly into the suction inlet of the pump. At least one elevating nozzle is movable to a position at which its liquid stream is directed downwardly by a deflector plate during the sinking stage of operation. At least one additional nozzle is mounted within the housing to direct liquid streams horizontally outwardly during the material discharge stage of operation. The nozzles are oscillated about vertical axes to direct the streams through horizontally extending areas of travel.

Additional objects and features of the invention will appear from the following description in which the preferred embodiment has been set forth in detail in conjunction with the accompanying drawing.

DESCRIPTION OF THE PREFERRED EMBODIMENT

Figure 1:
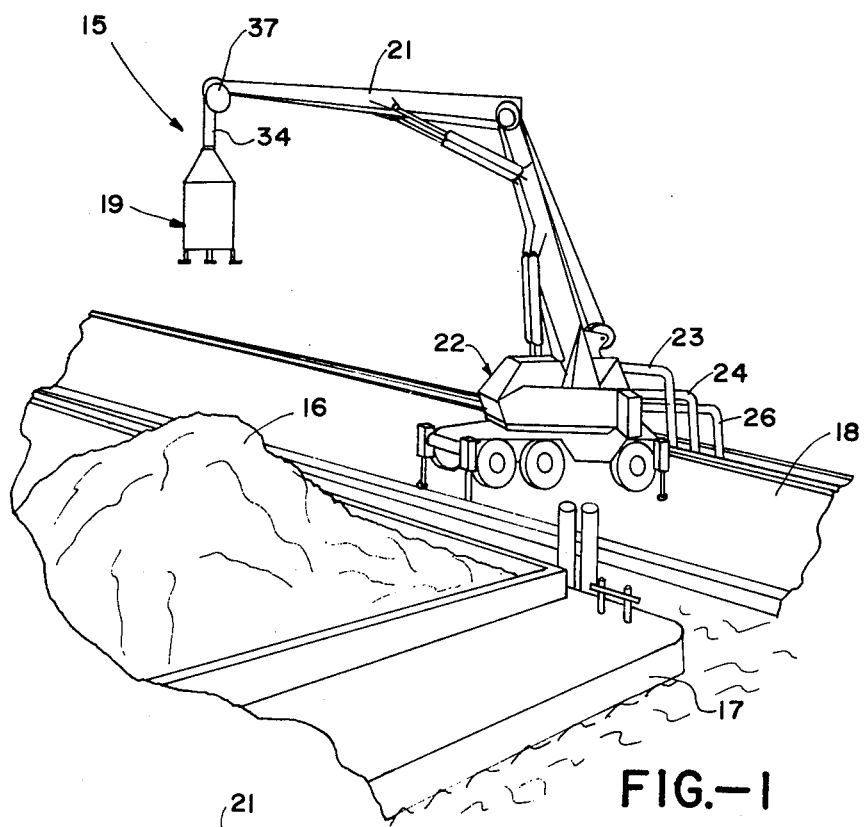
FIG. 1 is a perspective view of apparatus embodying the invention with the capsule illustrated in a position prior to entry into material that is loaded in a barge.

In the drawings FIG. 1 illustrates generally at 15 apparatus adapted to carry out the method of invention for removing a settled body of particulate material contained as a bulk cargo 16 within the floating vessel or barge 17 berthed along a pier 18. The exemplary cargo of particulate material loaded within the vessel will be described as a mineral salt. It also is contemplated that the method and apparatus of the invention can be used for the unloading or removal of other similar types of particulate material capable of being dispersed into a slurry with a liquid such as water, as an example the material could be dressed mineral ores. Further, the invention contemplates that the vessel containing the material could also be a large capacity cargo ship, a land vehicle such as a railroad hopper car, or a stationary container such as a bulk storage tank.

Apparatus 15 includes a portable caisson or housing 19 which is suspended from the boom 21 of a mobile crane 22. The crane is adapted to move along the deck of pier 18 for positioning the caisson over different portions of the barge, or alongside a number of different barges or vessels. The boom of the crane is also adapted to swivel about a vertical axis for unloading different portions of the cargo, and the boom furthermore is adapted to raise and lower for moving the caisson into and from the material. A high pressure water supply line 23 extends along the boom and interconnects the caisson with manifold piping leading along the pier from a suitable water pump, not shown, on the shore installation. A slurry discharge line 24 also extends along the boom and interconnects the caisson with manifold piping leading along the pier to a suitable slurry storage tank, pipeline or slurry processing station, not shown, on the shore installation. A conduit 26 extends along the boom to the caisson and encloses the hydraulic lines from the shore installation for operating the equipment contained in the caisson.

The caisson or housing 19 includes an outer cylindrical shell 27 enclosed at its upper end by a truncated conical shell 28 and circular end plate 29. A circular diaphragm plate 31 is mounted within the mid-span of the shell to define a water-tight upper compartment 32. The lower portion of the shell terminates with a circular lower rim 33 and opens downwardly toward the material being removed. The housing is suspended from the distal end of boom 21 by the sections of water supply and slurry discharge piping 34 extending between the housing and boom. The sections of conduits along the boom for the water supply, slurry discharge and hydraulic lines are joined together through suitable swivel connections at the boom end and articulated boom joints. The caisson thus is free to swing by gravity to a vertical orientation as the boom is raised and lowered.

Housing 19 includes a plurality, shown as four, of water jet nozzle assemblies 36, 37, 38 and 39 mounted within shell 27. Each nozzle assembly is adapted to direct a high pressure water stream outwardly from beneath lower rim 33 of the housing. The four nozzles are mounted at circumferencially spaced positions within the housing with one opposed pair of nozzle assemblies 38, 39, best shown in FIG. 8, comprising elevating nozzles with the remaining opposed pair of nozzles assemblies 36, 37, best shown in FIG. 5, comprising fixed nozzles. The fixed nozzles are vertically fixed with respect to the housing. Each of the four nozzles are mounted to oscillate about vertical axes for directing water streams back-and-forth through 280° paths of travel, in a manner to be presently described. The pair of elevating nozzle assemblies are adapted for operation during the sinking and clean-up stages, while the pair of fixed nozzles are adapted for operation during the material discharge stage.

Figure 5:
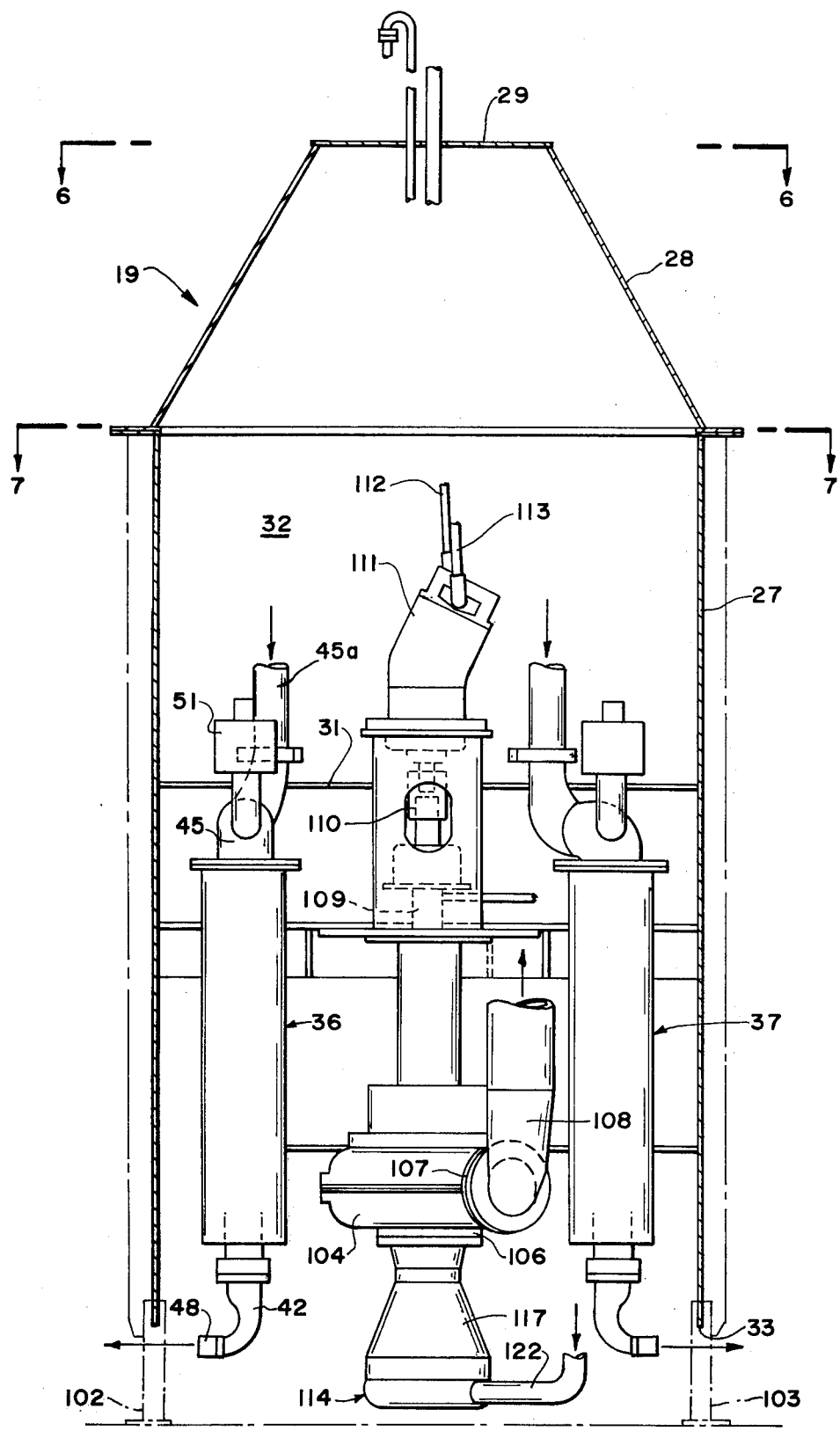
FIG. 5 is a vertical axial section view, to an enlarged scale, of the capsule of the apparatus of FIG. 1.
Figure 6:
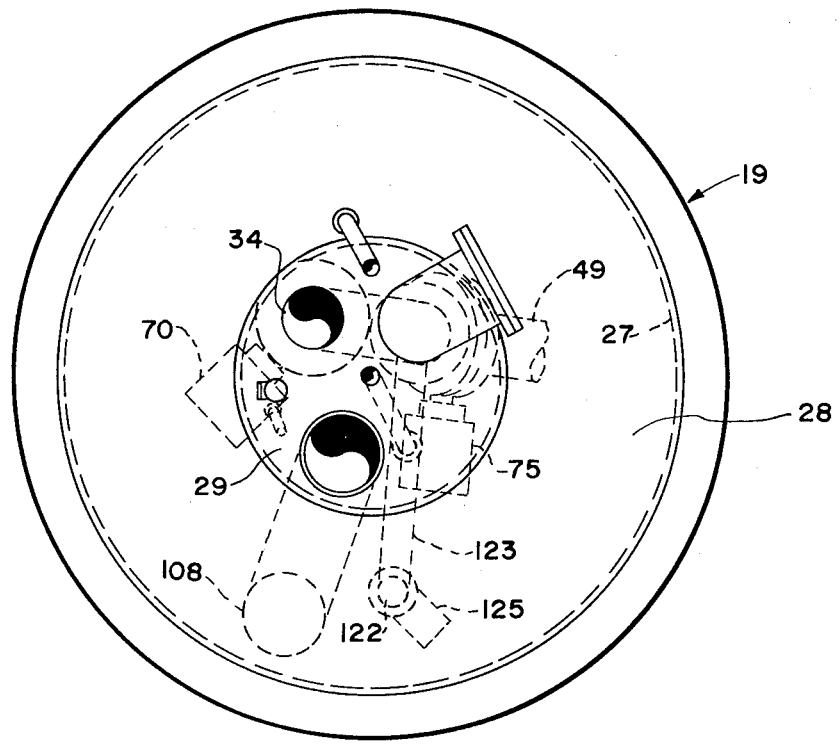
FIG. 6 is a cross-sectional view taken along the line 6—6 of FIG. 5.
Figure 7:
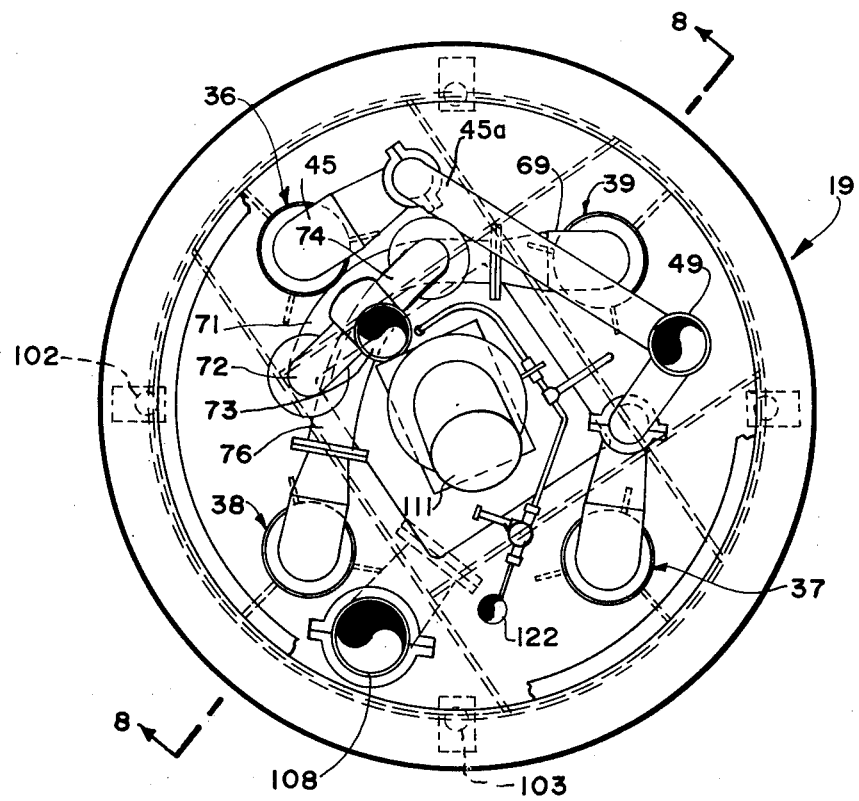
FIG. 7 is a cross-sectional view taken along the line 7—7 of FIG. 5.
Figure 9:
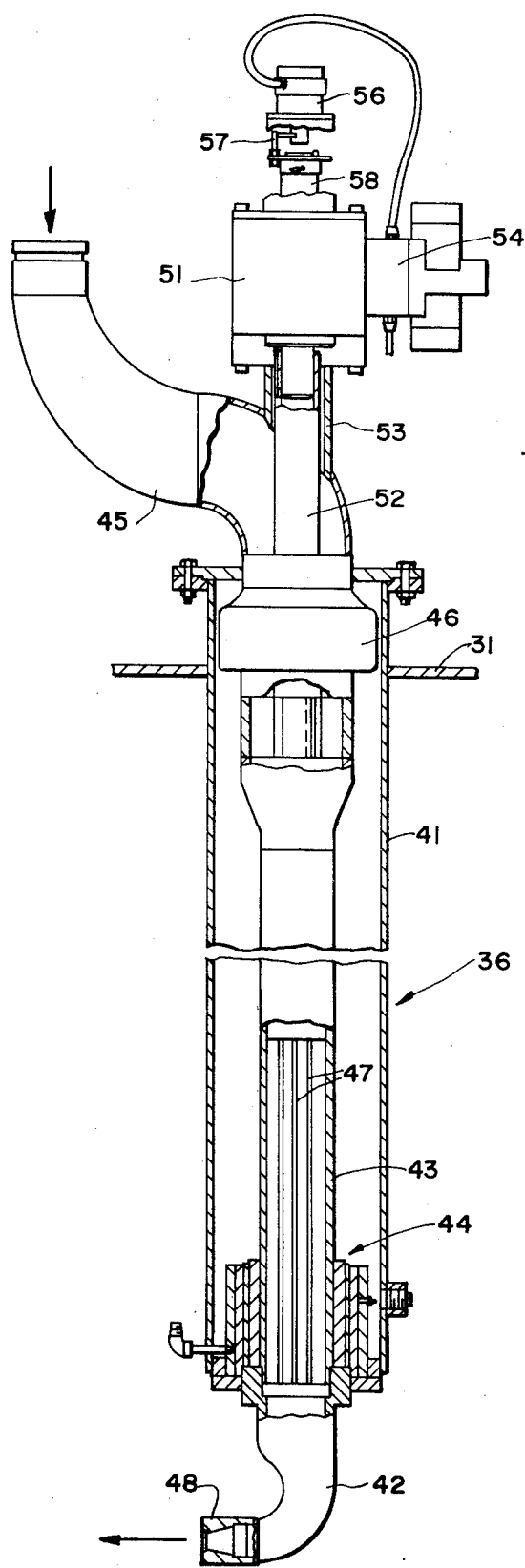
FIG. 9 is a fragmentary, partially broken-away, elevational view to an enlarged scale of the fixed nozzle illustrated in FIG. 5.

FIG. 9 illustrates at 36 a typical one of the pair of fixed nozzle assemblies. The assembly 36 includes a hollow cylindrical housing 41 extending downwardly through an opening formed in diaphragm plate 31. A nozzle head 42 and interconnected nozzle stem 43 are mounted for oscillating movement about a vertical axis on a rotary bearing and fluid seal assembly 44 at the lower end of housing 41, and on a rotary fluid coupling 46 at the upper end. Preferably the nozzle is of the type described in U.S. Pat. No. 3,749,314 issued July 31, 1973, assigned to the Marcona Corporation, employing a plurality of straightening vanes 47 and having a nozzle head configuration that is adapted to efficiently convert a supply of high pressure fluid into a high velocity fluid stream issuing through nozzle tip 48 at right angles, i.e., in an arc extending substantially horizontally from the caisson. Water is supplied to nozzle stem 43 and rotary coupling 46 by means of an S-fitting 45 which in turn is connected with a branch conduit 45a leading from a supply manifold 49, as shown in FIGS. 5 and 7. The supply manifold in turn is connected with the supply conduit 34 extending from the boom through circular end plate 29, as shown in FIG. 6.

Figure 11:
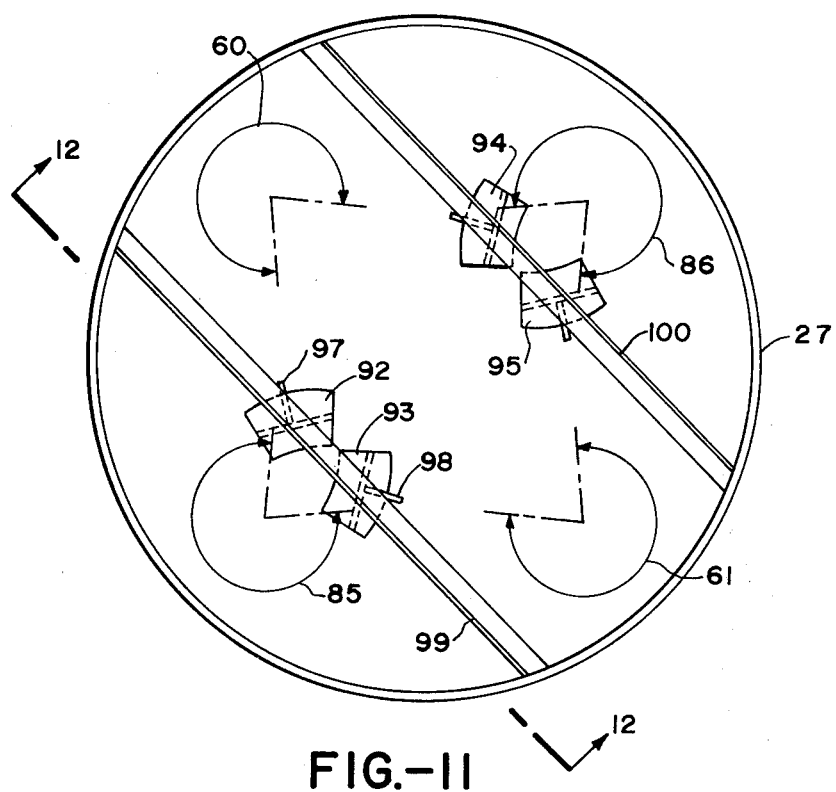
FIG. 11 is a fragmentary cross-sectional view taken along the line 11—11 of FIG. 5.
Figure 12:
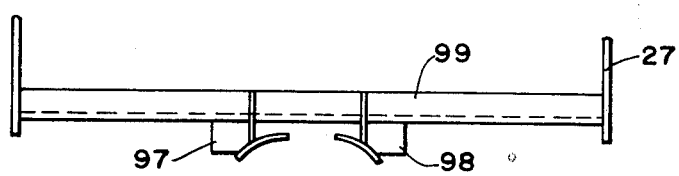
FIG. 12 is a sectional view taken along the line 12—12 of FIG. 11.
Figure 13:
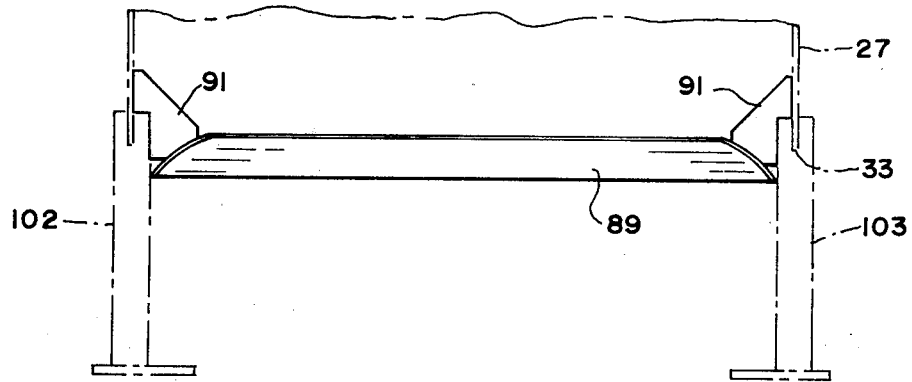
FIG. 13 is a fragmentary view in elevation illustrating the positioning of the outboard deflector plate with respect to the lower rim of the capsule housing; and, FIG. 14 is an elevational view, partially in axial section, of the annulus eductor structure of the invention.

The nozzle stem 43, head 42 and tip 48 are oscillated about a vertical axis by means of rotary actuator 51 mounted above S-fitting 45. The actuator is coupled with a drive shaft 52 extending into the S-fitting through vertical collar 53, with the shaft being coupled at its lower end to the upper end of nozzle stem 43. Rotary actuator 51 preferably is an hydraulic actuator powered by pressurized hydraulic fluid supplied from the hydraulic hose enclosed in the conduit 26 leading from a suitable hydraulic pump, not shown, at the shore installation. A four-way valve 54 controls actuator 51 for turning the nozzle back-and-forth through an arc of substantially 280° under influence of a rotary valve 56. The valve 56 in turn is actuated by a finger 57 projecting from the upper end 58 of the actuator drive shaft. FIG. 11 illustrates the plan view orientation of the two 280° arcs 60, 61 which are defined by the paths of the water streams from respective fixed nozzles 37, 37.

Figure 10:
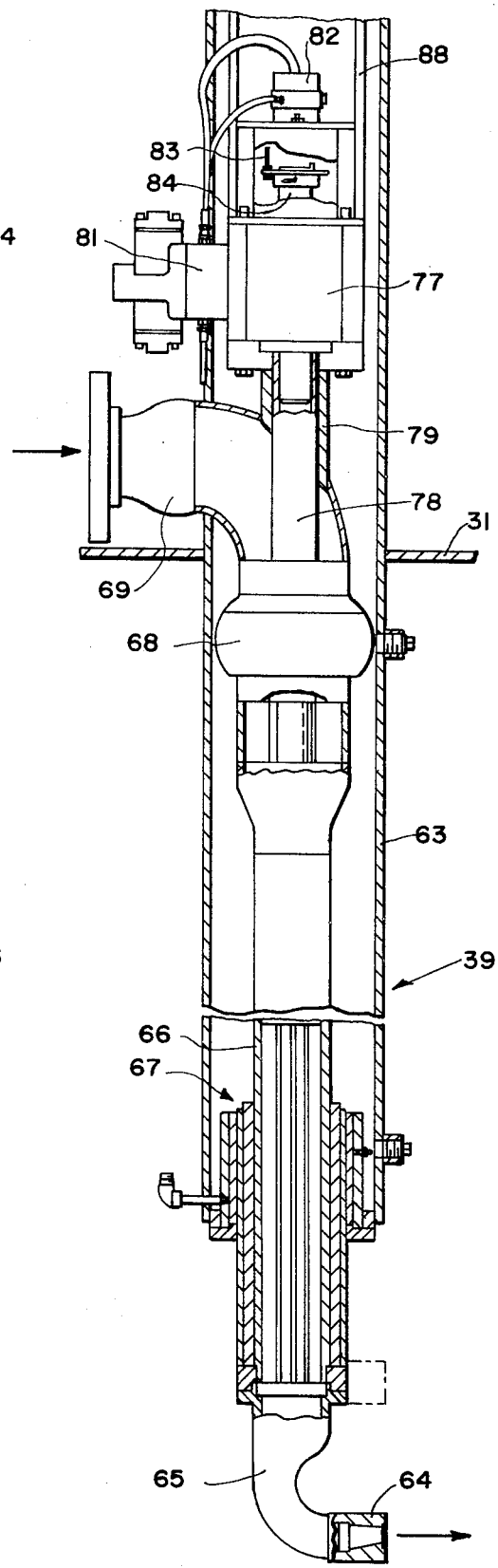
FIG. 10 is a fragmentary, partialy broken-away, elevational view to an enlarged scale of the elevating nozzle illustrated in FIG. 8.

FIG. 10 illustrates at 39 details of a typical one of the pair of elevating nozzle assemblies. A cylindrical housing 63 of the assembly is mounted to extend downwardly through an opening formed in diaphragm plate 31. A nozzle tip 64, head 65, and interconnected nozzle stem 66 are mounted for oscillating movement about a vertical axis on a rotary bearing and fluid seal assembly 67 at the housing lower end, and on a rotary fluid coupling 68 at the upper end. Preferably the nozzle is of the type described in the above-mentioned U.S. Pat. No. 3,749,314 in which the configuration is adapted to efficiently convert a high pressure liquid into a high velocity stream extending in a substantially horizontal direction. An elbow fitting 69 supplies water into rotary coupling 68 and nozzle stem 66 from a flexible water hose 71, best shown in FIG. 8. The water hose is connected at its upper end with a branch conduit 72 which in turn is connected with a conduit 73 that receives water from the supply conduit 34 suspended from the boom. Conduit 73 also feeds water through a branch conduit 74 and flexible hose 76 to the remaining elevating nozzle assembly 38. An hydraulically operated shut-off valve 70 is provided to control the flow through conduit 73 to the elevating nozzles, and a similar hydraulically operated shut-off valve 75 is provided to control the flow through conduit 49 to the fixed nozzles.

The nozzle stem, head and tip of elevating nozzle 39 are oscillated about a vertical axis by means of a rotary actuator 77 mounted above elbow 69 and enclosed within the portion of housing 63 which extends above diaphragm plate 31. Actuator 77 turns a drive shaft 78 which extends into elbow 69 through a vertical collar 79, with the shaft being coupled at its lower end to the upper end of nozzle stem 66. Preferably actuator 77 comprises an hydraulic actuator of the type described above for nozzle assembly 36. A four-way valve 81 controls actuator 77 for turning the nozzle back-and-forth through an arc of substantially 280° under influence of a rotary valve 82. The valve 82 in turn is actuated by a finger 83 projecting from the upper end 84 of the actuator drive shaft. The plan view orientation of the two 280° arcs 85, 86 subtended by streams from respective elevating nozzles 38, 39 is shown in FIG. 11.

Figure 8:
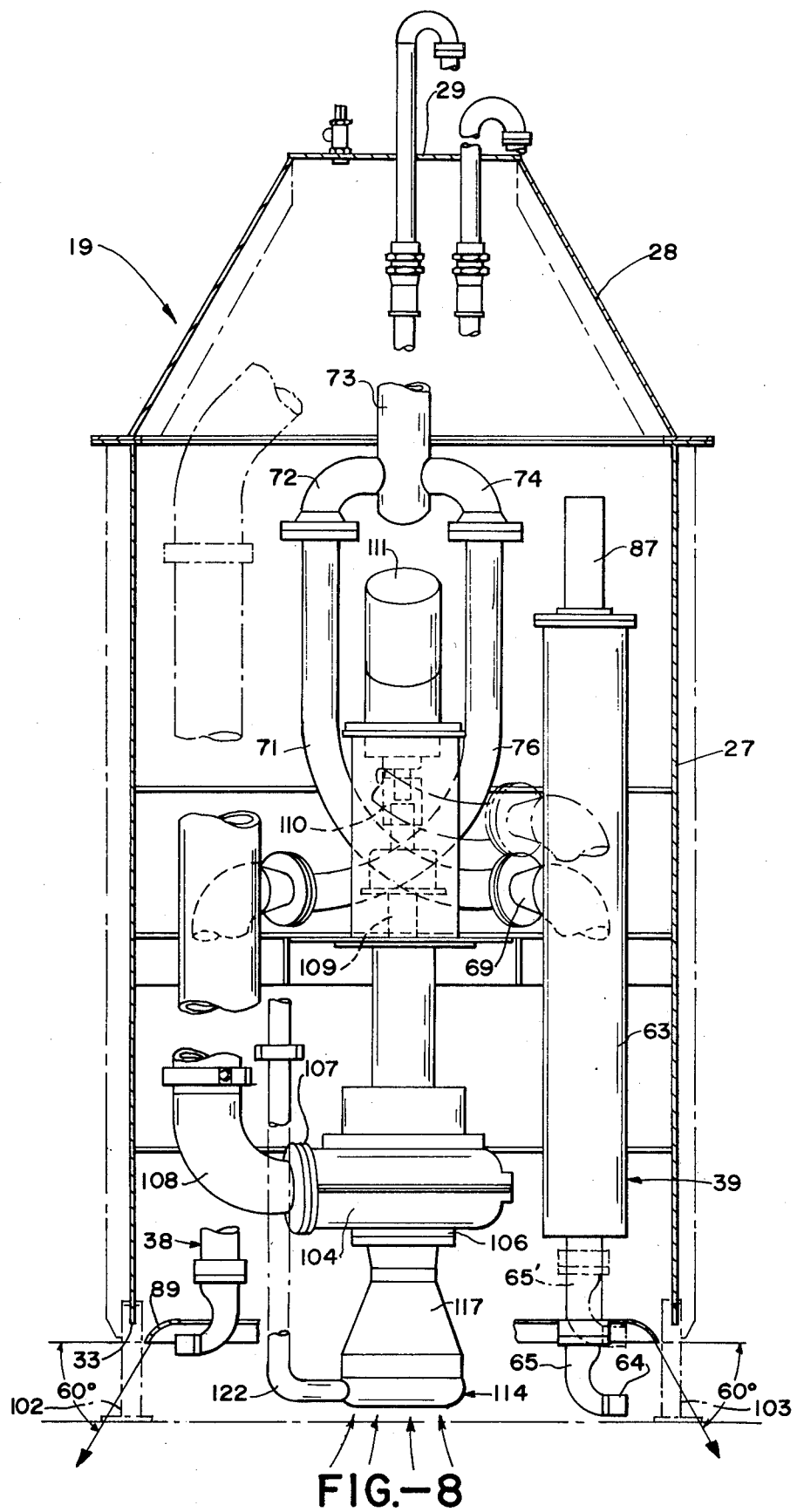
FIG. 8 is an axial sectional view taken along the line 8—8 of FIG. 7.

The nozzle stem, head and tip of elevating nozzle 39 are moved vertically between the lowered position shown in the solid line illustration of FIG. 8, and the raised position shown in broken line at 65', by means of a linear hydraulic actuator 87. Actuator 87 is mounted at the upper end of the upper portion of nozzle housing 63, and preferably comprises an hydraulic cylinder having a piston rod operably connected with a frame 88 which is mounted for movement with rotary actuator 77, as shown in FIG. 10. Extension and retraction of the piston rod moves the frame and actuator through a distance equal to the stroke of the cylinder, and this in turn moves nozzle stem 66 through bearing 67, carrying with it elbow 69 and the lower end of water supply hose 71.

Figure 2:
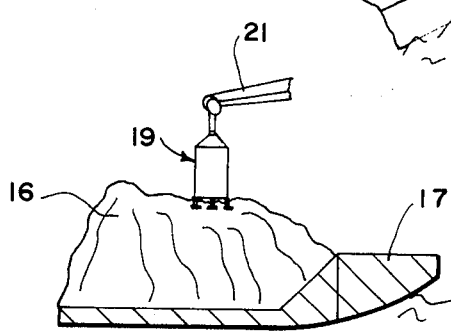
FIG. 2 is a cross-sectional view to a reduced scale of the barge and apparatus of FIG. 1 showing the capsule making initial entry into the material.
Figure 3:
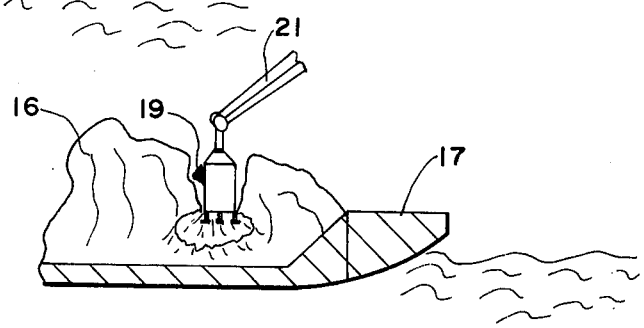
FIG. 3 is a view similar to FIG. 2 showing the capsule during the sinking stage of operation.

During the sinking stage of operation as the caisson is being lowered through the material toward the floor of the vessel, as illustrated in FIGS. 2 and 3, the two elevating nozzles 38, 39 are maintained in their fully raised positions. An annular deflector plate 89 is mounted on brackets 91 about the inner periphery of the lower rim 33 of the caisson housing, as shown in FIG. 11. This deflector plate is in the configuration of a downwardly concave section of a spherical shell and is positioned to present a downwardly inclined surface in the path of the liquid streams jetting from the elevating nozzles so as to deflect the streams downwardly from the caisson. Preferably the streams are deflected at an angle of substantially 60° from the horizontal, as shown in FIG. 8. Pairs of inboard deflector plates 92, 93 and 94, 95 are mounted on brackets 97, 98 to cross frame members 99, 100 extending across housing rim 33, with each pair of these inboard deflector plates being positioned with respect to the elevating nozzles 38, 39 so as to deflect their streams downwardly as the nozzles approach the extremities of their paths of oscillating travel. The downwardly deflected water streams impinge upon and form a slurry with the material underlying the caisson so that as this slurry is pumped away the caisson can be lowered to rest upon the floor of the vessel.

Four support legs 102, 103 are mounted about housing rim 33 and extend downwardly to contact the vessel's floor, with the vertical space between the floor and rim defining an annular opening or portal through which the water streams can be directed outwardly, and through which the slurry can flow inwardly for removal by the pump during the sinking, discharge and clean-up stages of operation. During the discharge stage, the operation of the two elevating nozzles is terminated while that of the fixed nozzles is initiated. During the clean-up stage, operation of the fixed nozzles is terminated, while the elevating nozzles are extended to their lowered positions and operated in a manner to be described.

The slurry which is formed by the action of the liquid jetting from the nozzles is pumped away by means of a slurry pump 104 mounted within the lower portion of housing 27. The slurry pump is a mechanically driven pump mounted with its suction inlet 106 opening downwardly and with its outlet 107 connected with a slurry discharge conduit 108. The pump is driven by means of a vertical drive shaft 109 connected at coupling 110 with a rotary motor 111 mounted within water-tight compartment 32. Preferably the motor is hydraulically powered by hydraulic fluid supplied through lines 112 and 113 leading from a pump, not shown, on the shore installation through the conduit 26 which extends along the boom. Suitable motor control means is provided to selectively vary slurrying pump speed as fluctuating slurry flow rate conditions are encountered during operation. Slurry discharge conduit 108 extends upwardly through housing end plate 29 where it is coupled with the discharge line 24 leading along the boom to the deck mounted discharge manifold and the desired pipeline, storage tank or processing plant at the shore installation.

Figure 14:
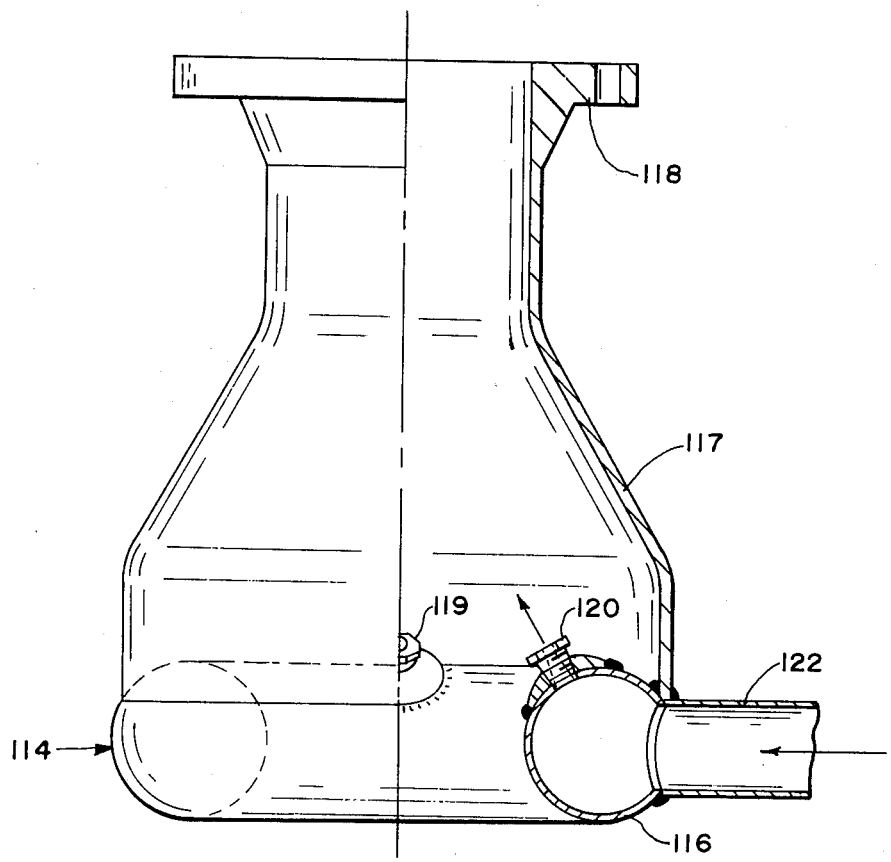

Eductor means is positioned vertically below and in series with the suction inlet of pump 104. As best shown in FIG. 14 the eductor means comprises an annulus eductor pump which includes an annular conduit 116 mounted in spaced relationship below the pump 104 by means of a frusto-conical throat conduit 117 which is secured to the suction inlet by a circle of bolts around flange 118. A plurality, preferably eight, of spray nozzles 119, 120 are mounted in spaced relationship about the upper side of conduit 116, with each spray nozzle being inclined from the vertical to direct a stream of a liquid such as water toward the pump suction inlet. Water is supplied to the eductor conduit and spray nozzles by means of an eductor supply conduit 122 which is connected through a branch conduit 123 with the main supply conduit 34, which also feeds to the elevating and fixed nozzles. A suitable control valve 125 is provided in the eductor supply conduit to selectively control the flow rate through the eductor spray nozzles. Typically annulus eductor 114 is operated in combination with pump 104 near the end of a discharge stage when the level of slurry approaches the bottom floor of the vessel, as well as during the clean-up stage of operation. The eductor provides additional fluid flow during low slurry flow conditions and the clean-up stage both to maintain the pump prime and to provide a boost to the suction lift of the pump, thereby affording continuous pumping action.

The use and method of operation of the invention will be described in relation to the unloading of a cargo of salt as the material 16 loaded within the hold of barge 17. The mobile crane 22 is maneuvered along the deck of pier 18 adjacent the barge and the water supply conduit 23, slurry discharge conduit 24 and hydraulic hose conduit 26 are connected with the respective manifolds leading to the shore installation. The boom is operated to position capsule 19 over the cargo with the capsule control system operated to actuate the hydraulic cylinders 87 for moving the elevating nozzles 38, 39 to their fully raised or digging positions. The control system is then operated to open the valve 70 for directing high pressure water to the elevating nozzles, and also to operate the rotary actuators 77 for oscillating the elevating nozzles back-and-forth through their 280° arcs of travel. The water streams from these nozzles impinge upon the outboard deflector plate 98 which deflects the streams downwardly at an angle of substantially 60° from the horizontal. As the nozzles approach the extremities of their arcs of travel the streams impinge upon the inboard deflectors 92–95 which similarly deflect the streams at an angle downwardly. The control system is further actuated to energize motor 111 for driving the slurry pump.

Figure 4:
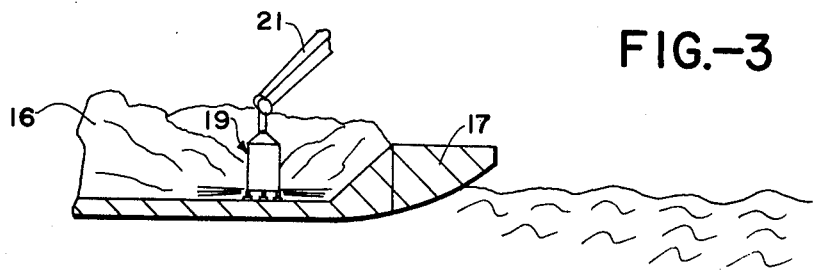
FIG. 4 is a view similar to FIG. 2 showing the capsule on the bottom of the barge during the discharge stage of operation.

With the equipment operating as described the boom is gradually lowered to progressively move the capsule into the body of material from the entry position of FIG. 2 toward the floor of the barge. The water streams deflected downwardly from the bottom of the capsule impinge upon, break up and form a pumpable slurry with the underlying material, as shown in FIG. 3. The slurry which is formed flows into the throat of annulus eductor 114 and enters the suction inlet of pump 104 which pumps the slurry away to the shore installation through discharge conduit 108. The slurry which is displaced and pumped away in this manner allows the capsule to be lowered or sunk further until it rests upon the floor of the barge, as shown in FIG. 4.

The discharge stage of operation is initiated when the capsule reaches the barge floor, or when the capsule reaches any desired intermediate position above the floor. At the initiation of the discharge stage the valve 70 supplying the elevating nozzles is closed and the valve 75 supplying the fixed nozzles is opened. At the same time the control system initiates operation of the rotary actuators 51 for oscillating the two fixed nozzles back-and-forth through their 280° arcs of travel. The high pressure water streams from the two fixed nozzles are directed horizontally outwardly below the housing rim to impinge upon, break up and form a slurry with the surrounding material. The slurry which is formed is pumped away by operation of pump 104 in the manner previously described. The action of the horizontal streams from the fixed nozzles creates progressively enlarged undercut cavities in the material as the streams move back-and-forth along their paths of travel. These cavities are gradually enlarged sufficiently to cause the overburden of material to cave in and form a slurry as it falls into the water streams. This action continues until the material within the zone of influence of the streams from the fixed nozzles is reslurried and pumped away.

Flow control valve 125 for directing high pressure water to annulus eductor 114 is opened for operating the eductor when it is desired to maintain the pump prime and to provide additional liquid to the pump during low slurry flow. Preferably the annulus eductor is operated near the end of the discharge stage of operation when the volume of slurry is reduced to a level approaching the throat of the annulus eductor and where there is a danger of breaking the pump's suction. In addition, operation of the annulus eductor in series with the slurry pump 104 further avoids suction loss through entrainment of air into the pump by eddy flows which could occur at low slurry levels.

Upon removal of the majority of the material following completion of the discharge stage, the flow control valve 75 for the fixed nozzles is closed. The control system is then actuated to operate the two cylinders 87 for lowering elevating nozzles 38, 39 to a position immediately above the floor of the barge for initiation of the clean-up stage. The flow control valve 70 for the elevating nozzles is again opened and the rotary actuators 77 are operated for oscillating these nozzles to direct water streams along paths of travel immediately above the barge floor to form a slurry with the remnant material. During this clean-up stage annulus eductor 114 is operated in combination with the slurry pump to prevent loss of pump prime.

Following completion of the clean-up stage of operation, water flow to the nozzles is shut off and operation of the slurry pump and eductor is terminated. Boom 21 is then raised to move caisson 19 to another portion of the cargo in the barge, or to another loaded barge or vessel alongside the pier, with the foregoing steps then repeated in the manner described.

It is apprenet from the foregoing that there has been provided new and improved reslurrying method and apparatus by which a body of particulate material can be easily removed or unloaded by means of relatively small, compact and inexpensive portable equipment. Furthermore, the method and apparatus of the invention makes it feasible to unload a barge, ship or other similar vessel or container without the necessity of providing reslurrying equipment in the vessel itself.

While the foregoing embodiment is at present considered to be preferred it will be understood that numerous variations and modifications may be made therein by those skilled in the art, and it is intended to cover in the appended claims all such variations and modifications as fall within the true spirit and scope of the invention.

We claim:

1. A method for removing settled body of particulate material capable of being formed into a slurry with a liquid, the method employing a housing, support means for moving the housing, first nozzle means, mechanically driven slurry discharge pump carried in the lower region of said housing and having a suction inlet thereat, eductor means having second nozzle means positioned vertically below and in series with the slurry pump means, a throat conduit between the eductor means and the inlet of said pump, and means to supply water under pressure to the first and second nozzle means, the method including the steps of discharging liquid streams from the first nozzle means into the material, operating the support means to lower the housing into body of material while causing the streams to impinge upon and form a slurry with said material whereby the slurry flows into the lower region of said housing, operating said discharge pump to pump the slurry to a zone remote from the housing, and directing additional liquid streams from the second nozzle means upwardly through the throat conduit into the inlet of the discharge pump during conditions of low volume slurry flow to maintain the prime of said pump.

2. A method for removing a settled body of particulate material capable of being formed into a slurry with a liquid, the method employing a plurality of nozzles and a slurry discharge pump carried by a housing, at least one of said nozzles comprising an elevating nozzle mounted to direct a liquid stream in a substantially horizontal direction and having at least one deflector plate mounted adjacent thereto, the method including the steps of discharging a liquid stream through said elevating nozzle, positioning said elevating nozzle so that the stream discharging therefrom is directed against and deflected from said plate in a downward direction to impinge upon and form a slurry with said material, lowering said housing into said body while operating said discharge pump to pump said slurry to a zone remote from the housing for a sinking stage of operation, terminating operation of said elevating nozzle when said housing is lowered to a predetermined elevation within said body, directing an additional liquid stream through at least an additional nozzle in a substantially horizontal direction to form a slurry with said material, operating said pump to pump said last mentioned slurry to a zone remote from the housing for a discharge state of operation, terminating the stream of liquid through said additional nozzle, lowering said elevating nozzle to a position below said deflector plate, directing a stream of liquid through said elevating nozzle to form additional slurry with the material, and operating said pump to pump said additional slurry to a zone remote from the housing for a cleanout stage of operation.

3. Apparatus for use in removing a settled body of particulate material capable of being formed into a slurry with a liquid in which said material is contained within a vessel having a bottom floor, the combination of a housing having a lower rim and a plurality of downwardly extending feet adapted to rest upon said floor and support the housing with its rim spaced above said floor, means for moving the housing to and from the body and for positioning the housing within the body, nozzle means for directing liquid outwardly from the housing to impinge upon and form a slurry with the material, said nozzle means including at least one elevating nozzle mounted to direct a stream of liquid in a horizontal direction, means to turn said elevating nozzle about a vertical axis whereby its liquid stream is moved through a substantially horizontal extending path, means for directing liquid under pressure to said nozzle means, stream deflector means for deflecting at least a portion of the liquid from said nozzle means in a direction generally downwardly from said housing to form a slurry with the material for sinking the housing into the body, said deflector means including at least one deflector plate carried by said housing and having a surface which is inclined from a horizontal direction, means for moving said elevating nozzle to a first position in which its liquid stream impinges upon said deflector plate and is deflected downwardly for a sinking stage of operation, said last mentioned means further moving said elevating nozzle to a second position at which its liquid stream is in a plane spaced from said deflector plate, said elevating nozzle being adapted to move to its second position to direct a liquid stream outwardly through the space between said rim and floor for a clean-out stage of operation, said deflector plate comprising at least a segment of an annular surface positioned in said path when said elevating nozzle is moved to said first position during a sinking stage of operation, and pump means for pumping the slurry to a zone remote from the housing.

4. Apparatus for removing a settled body of particulate material capable of being formed into a slurry with a liquid, including the combination of a housing, means for moving said housing to and from said body and for positioning the housing within the body, nozzle means carried by the housing for directing a stream of liquid from the housing to impinge upon and form a slurry with said material, mechanically driven pump means carried by the housing for pumping the slurry to a zone remote from the housing, said pump means having a suction inlet which opens in a direction generally downwardly from said housing, and eductor means positioned substantially vertically below and in series with said pump means for directing additional liquid in a direction generally upwardly into said suction inlet, a throat conduit mounted between said eductor means and said suction inlet, and means to supply water under pressure to said nozzle means and to said eductor means.

5. Apparatus as in claim 4 in which said eductor means includes an annular conduit positioned in spaced relationship below said suction inlet, and eductor nozzle means mounted on said annular conduit for directing said additional liquid into the suction inlet.

6. Apparatus as in claim 5 in which said annular conduit is disposed in a substantially horizontal plane and said eductor nozzle means includes a plurality of spray nozzles spaced about the circumference of said annular conduit, each of said spray nozzles being positioned to direct a stream of liquid in a direction toward said suction inlet.

7. Apparatus for removing a settled body of particulate material capable of being formed into a slurry with a liquid, including the combination of a housing, means for moving the housing to and from the body and for positioning the housing within the body, nozzle means for directing liquid outwardly from the housing to impinge upon and form a slurry with the material, means for directing liquid under pressure to said nozzle means, stream deflector means for deflecting at least a portion of the liquid from said nozzle means in a direction generally downwardly from said housing to form a slurry with the material for sinking the housing into the body, operating means for causing relative vertical movement between the nozzle means and stream deflector means whereby the latter is selectively brought into or out of a stream deflecting position across the path of the stream from the nozzle means, and pump means for pumping the slurry to a zone remote from the housing.

8. Apparatus for removing a settled body of particulate matter capable of being formed into a slurry with a liquid, including the combination of a housing, means for moving the housing to and from the body and for positioning the housing within the body, nozzle means including at least one elevating nozzle mounted to direct a stream of liquid in a horizontal direction to impinge upon and form a slurry with the material, means for directing liquid under pressure to said nozzle means, stream deflector means for deflecting at least a portion of the liquid from said nozzle means in a direction generally downwardly from said housing to form a slurry with the material for sinking the housing through the body, said deflector means including at least one deflector plate carried by said housing and having a surface which is inclined from a horizontal direction, means for moving said elevating nozzle to a first position in which its liquid stream impinges upon said deflector plate and is deflected downwardly for a sinking state of operation, said last mentioned means further moving said elevating nozzle to a second position in which its liquid stream is in a plane spaced from said deflector plate, and pump means for pumping the slurry to a zone remote from the housing.

9. Apparatus as in claim 8 which includes means to turn said elevating nozzle about a vertical axis whereby its liquid stream is moved through a substantially horizontally extending path, and said deflector plate comprises at least a segment of an annular surface positioned in said path when said elevating nozzle is moved to said first position during a sinking stage of operation.

10. Apparatus as in claim 8 in which said nozzle means includes at least one additional nozzle circumferentially spaced from said elevating nozzle, together with means for turning said additional nozzle about a vertical axis to direct a liquid stream in a path extending in a substantially horizontal plane from said housing during a material discharge stage of operation.

11. Apparatus for removing a settled body of liquid dispersable particulate material contained within a vessel having a bottom floor, including the combination of a housing, means for moving the housing to and from the body and for positioning the housing within the body, nozzle means for directing a liquid outwardly from the housing to impinge upon and disperse the material into a slurry, the nozzle means including at least one elevating nozzle carried by the housing to direct a stream of liquid in a substantially horizontal path, deflector means on the housing for deflecting the path of a horizontal stream of liquid in a direction extending downwardly from the housing, means to raise the elevating nozzle to a first position in which its liquid stream impinges upon and is deflected by said deflector means during a sinking stage of operation, and further to move said elevating nozzle to second position at which its liquid stream clears said deflector means during a clean-out stage of operation, said nozzle means further including at least one additional nozzle mounted to direct a stream of liquid in a substantially horizontal extending path, means for turning said elevating nozzle and said additional nozzle about respective vertically extending axes whereby respective liquid streams therefrom are directed through horizontal arcs of travel, mechanically driven pump means carried by said housing for pumping slurry to a zone remote therefrom, said pump means having a suction inlet which opens in a direction extending toward the floor of the vessel, eductor means positioned substantially vertically below and in series with said suction inlet, said eductor means including an annular conduit and additional nozzle means to spray liquid from said annular conduit towards said suction inlet.

* * * * *